United States Patent [19]

Kazuo et al.

[11] 4,180,590
[45] Dec. 25, 1979

[54] METHOD OF PRODUCING SOY SAUCE

[75] Inventors: Yamashita Kazuo, Yotsukaichi; Kuroyanagi Koji; Matsuo Naoki, both of Suzuka, all of Japan

[73] Assignee: Shono Denpun Kabushiki Kaisha, Suzuka, Japan

[21] Appl. No.: 819,203

[22] Filed: Jul. 26, 1977

[30] Foreign Application Priority Data

Oct. 28, 1976 [JP] Japan .................................. 51-129758

[51] Int. Cl.² ............................................. A23L 1/238
[52] U.S. Cl. ......................................... 426/18; 426/44; 426/46; 426/48; 426/49; 426/52; 426/60; 426/589
[58] Field of Search ........................ 426/18, 44, 46, 48, 426/49, 52, 60, 589, 650

[56] References Cited

U.S. PATENT DOCUMENTS

| 3,495,991 | 2/1970 | Magi et al. | 426/46 |
| 3,914,436 | 10/1975 | Nakadai et al. | 426/46 |

FOREIGN PATENT DOCUMENTS

| 51-19196 | 2/1976 | Japan | 426/46 |
| 51-38492 | 3/1976 | Japan | 426/46 |
| 51-51592 | 5/1976 | Japan | 426/46 |
| 51-51593 | 5/1976 | Japan | 426/46 |

Primary Examiner—Alvin E. Tanenholtz
Assistant Examiner—Esther M. Kepplinger
Attorney, Agent, or Firm—Lawrence I. Field

[57] ABSTRACT

A novel seasoning liquor having excellent seasoning effect with high nitrogen and alcohol contents, and a method for producing the same by using, as the main raw material, a protein aqueous solution or dispersion containing starch and being obtained from corn. The production method comprises the steps of: saccharifying the starch by adding amylolytic enzyme such as α-amylase to the raw material, performing lactic fermentation by adding lactic acid bacteria, then pasteurizing and deactivating said enzyme by heating, and decomposing the protein and starch by adding koji containing, as substrates, corn starch, wheat and the like, further performing alcohol fermentation by adding yeast. The concentration of sodium chloride is increased step by step according to the increase of alcohol concentration, and the fermentation and ripening can be finished within a short time of about 25–35 days.

9 Claims, No Drawings

METHOD OF PRODUCING SOY SAUCE

BACKGROUND OF THE INVENTION

This invention relates to a novel seasoning liquor and a method for producing the same.

In the production of soy sauce in the conventional art, soybean and wheat are used as nitrogen sources. That is, after the heat treatment of the mixture of soybean and wheat, the treated mixture is inoculated with koji-mold (seed culture for the preparation of koji) and it is then incubated to obtain koji (mold preparation containing developed mycelium of koji-mold used for preparing soy source, alcoholic liquor, etc.). The fermentable mash is prepared by adding a saline solution to the koji. In the fermentation of the koji, the protein and starch of koji-substrate are decomposed, respectively, by protease and amylase contained in the koji, and further, lactic acid bacteria and yeast in the koji also act on the mash, thereby obtaining fermented mash for the preparation of soy sauce.

This method is, however, economically disadvantageous in that several months are necessary for the production. In addition, the coefficient of utilization of protein and starch in the used soybean and wheat for soy sauce, is quite low.

Meanwhile, the development of a method for producing seasoning liquors by using corn in place of the above-mentioned soybean and wheat has been desired since the corn can be produced in large quantities at low cost. In other words, corn protein is widely used mainly for the production of animal feed and the rate of production of corn is quite large and stable as compared with those of soy bean and wheat. So that the corn is very abundant as a protein source and inexpensive with the relative price of about 50% of soybean and about 80% of wheat. The amino acid composition in the protein of corn is quite similar to those of soybean and wheat so that the development of production method for seasoning liquor by using corn as the main fermenting material, has been sought. However, any satisfactory method has not been found since the protein of corn is hardly decomposed or digested by enzyme.

Meanwhile, by using soybean and wheat as protein sources, the method for preparing amino acid seasoning liquor by acid decomposition is employed, in which corn is also used in combination. For example, protein is hydrolyzed into amino acids by treating it with a mineral acid such as hydrochloric acid at an elevated temperature. The decomposed product is then neutralized and refined to obtain an amino acid seasoning liquor. In another method, the amino-bonds of protein are partially cut by hydrochloric acid and the product is subjected to fermentation by adding soy sauce mash or draft soy sauce, thereby obtaining a new-type soy sauce. In these methods, the rate of decomposition or utilization can be improved as compared with the conventional fermenting method and the period for production is much reduced, however, the methods are accompanied with the formation of unwanted substances such as levulinic acid and formic acid because the carbohydrates mixed in vegetable protein are easily hydrolyzed as compared with the protein itself and the carbohydrates are decomposed to excess.

In order to eliminate the above-described defects present in the conventional methods and to develop a novel method for producing seasoning liquor of excellent quality by enzymatic digestion of corn protein, the inventors of this invention have carried out extensive studies, and as the result, the present invention has been accomplished.

SUMMARY OF THE INVENTION

In the method of the present invention, amylolytic enzyme is firstly added to the solution or dispersion of corn protein containing some starch to convert the starch, and lactic fermentation is then carried out by adding lactic acid bacteria. The pH of resultant liquid is thus adjusted to 4.0–5.0 and it is then subjected to heat treatment so as to pasteurize and deactivate the above bacteria and enzyme. Then, added to this material is koji which contains substrates of at least two members selected from the group consisting of corn starch, wheat, wheat bran and soybean. Further, yeast is added to the above mixture and the decomposition of protein and starch and alcohol fermentation are carried out. Thus obtained seasoning liquor is characterized in that total nitrogen is 1.8–2.5 W/V%; formol nitrogen, 1.1–1.6 W/V%, alcohol 2–4 W/V%; reducing sugar, 1.0–2.0 W/V%; sodium chloride, 15–18 W/V%; pH, 5.0–5.2; and buffer index, 0.5–0.6.

Accordingly, it is an object of the present invention to provide a novel seasoning liquor which is of good tint, taste and odor without containing any disagreeble substances, and high in nitrogen concentration and alcohol concentration, and produced by fermentation together with enzymatic digestion using, as the main raw material, corn protein that has not been employed in the conventional prior art method.

Another object of the present invention is to provide a novel seasoning liquor which is, in itself, resistant to the contamination of bacteria and mold.

A further object of the present invention is to provide a seasoning liquor which contains organic acids but none of mineral acid, and is high in buffer capacity, and further, the taste of the undiluted liquor is not changed so much when it is diluted to some extent.

Still a further object of the present invention is to provide a method for producing a novel seasoning liquor of good odor and taste without any disagreeable substance and high in nitrogen concentration, in which method the raw material of corn protein is subjected to enzymatic digestion and fermentation.

Furthermore, the object of the present invention is to provide a method for producing a seasoning liquor of high seasoning effect and buffer capacity, by short time fermentation at low cost.

These and other objects, features and advantages of the present invention will become more apparent by the following description.

DETAILED DESCRIPTION OF THE INVENTION

In the method of the present invention for producing a seasoning liquor, in the first place, the aqueous solution or dispersion of corn protein is treated with amylolytic enzyme. The aqueous solution or dispersion of corn protein generally contains 20–30% by weight of protein and 5–20% by weight of starch, however, if necessary, the method of the invention can be applied to a thinner or thicker solution or dispersion as compared with the above. As the amylolytic enzymes, for example, α-amylase and glucoamylase are advantageously used. The quantities of addition of the enzymes to one gram of starch are 40–120 units, preferably 120 units, of α-amylase and 4–12 units, preferably 6–8 units, of glucoamylase. The condition for saccharification is generally 20–50 hours at 50°–60° C., and preferably, 24–36 hours at 53°–57° C.

By the above saccharification, the liquid viscosity is reduced and the glucose content is increased, and further, the alcohol fermentation and protein decomposition are promoted. Thus, it has been confirmed by the inventors of the present invention that the above is due to the simultaneous occurrence of the alcohol fermentation and the decomposition of protein. The second feature of the present invention is that the use of koji can be saved as much as the quantity corresponding to the saccharification power of amylase. Further, the third feature is that the reddish brown color of the raw material liquid is increased by the treatment so that the color of product can be made deeper.

In the next step, the treated liquid is inoculated with lactic acid bacteria to carry out lactic fermentation. This lactic fermentation is done with the object of suppressing the growth of infectious microbes and preventing the product from gathering mold by the existence of produced lactic acid. The addition quantity of lactic acid bacteria may be sufficient when the pH of liquid becomes 4.0 to 5.0 after the treatment. As the lactic acid bacteria, the genus of Lactobacillus can be used.

The liquid treated in the above step is then subjected to heat treatment so as to kill the bacteria and to deactivate the enzyme, then solid koji and yeast are added to it. The condition of 30–60 minutes at 70°–80° C. may be generally sufficient for the above heat treatment.

The suitable addition quantity of solid koji is one to three times as much as the weight of protein contained in the treated liquid. Before the koji is added, it is soaked in 15–25 wt.% saline solution of 2 to 3-fold quantity for 24 hours at room temperature. It is necessary that the concentration and quantity of the soaking saline solution is so adjusted that the concentration of sodium chloride in the liquid becomes 5–6% when the soaked koji is added. After this addition of koji, the mixture is maintained at a temperature in the range of 25°–33° C., preferably 30°–33° C., for 24–48 hours. While a halotolerant yeast such as Sacchromyces rouxii is separately cultured and this is added to the above mixture so as to perform simultaneous alcohol fermentation at 25°–33° C. The fermentation is carried out by adding sodium chloride stepwise, as follows. After 4–6 days from the addition of yeast, vigorous initial fermentation is ceased and the concentration of alcohol is the mash exceeds 1 W/V% (hereinafter indicated simply as "%"). In this stage, sodium chloride is added to the mash to the concentration of 11–12% by weight, and the fermentation is continued further. When the fermentation slows down and the alcohol concentration exceeds 2% after about 14–20 days, sodium chloride is again added to concentration of 15–18% by weight in the mash, and the after-fermentation is conducted for about 10–20 days. The fermented mash is then filtered by pressing and the obtained liquid is pasteurized at about 80°–90° C., and it is further refined by filtration. Thus obtained seasoning liquor has good color and taste, is high in nitrogen content, and is resistant to contamination of bacteria and molds.

As described above, the obstruction to alcohol fermentation owing to the existence of sodium chloride can be removed by dividing the addition of the sodium chloride into three steps, thereby attaining the digestion and fermentation in a short period of time. In addition, the increase in the concentration of sodium chloride prevents the fermenting mash from the contamination with infectious microbes. The koji used in the method of the present invention can be prepared according to the conventional method by appropriately compounding corn starch, wheat, wheat bran and soybean (processed soybean), subjecting it to thermal degeneration in the presence of water, and inoculating and culturing it with koji-mold (mixture of Aspergillus oryzae and Aspergillus sojae) which produce protease and amylase.

The seasoning liquor prepared by the above-described method of the present invention has the composition of total nitrogen: 1.8–2.5%, formol nitrogen: 1.1–1.6%, alcohol: 2–4%, sugar content: 1.0–2.0%, and sodium chloride: 15.0–18%. Further, the seasoning liquor is characterized in the hydrogen ion concentration, pH of 5.0–5.2 and buffer index of 0.5–0.6.

The composition of a typical product in the conventional method is such that total nitrogen: 1.3–1.6%, formol nitrogen: 0.7–0.9, alcohol: 0.1–1.0, sugar content: 1–2%, sodium chloride: 17–18%, pH: 4.7–4.9, and buffer index: 1.0–1.2. As understood from the above, the seasoning liquor of the present invention is superior to the conventional one in view of the total nitrogen, formol nitrogen and buffer index.

With the above-described present invention, the following effects can be expected.

Corn protein is produced in large quantities at low cost and it is presently used mainly for animal feed. The use of this corn protein can be converted by the preparation of the seasoning liquor of the present invention.

In the seasoning liquor of the present invention, the nitrogen concentration is high, especially, the ratio of formol nitrogen to the total nitrogen is 55–70%, and further, the glutamic acid content in amino acid components is about 18%, therefore, the seasoning liquor has quite excellent effect in giving a good taste without the necessity of additional sodium glutamate.

In the seasoning liquor of the present invention, since the digestion of starch and protein and the alcohol fermentation is performed completely, and in addition, the lactic fermentation is performed by using lactic acid bacteria of the genus of Lactobacillus, the seasoning liquor in itself is resistant to the contamination with infectious bacteria and molds, and it is not necessary to add any antiseptic or alcohol as fungicide.

Further, the seasoning liquor of the present invention has a large buffer capacity because only organic acids are contained without any inorganic acid, and intermediate products of glycerol, aldehyde and esters are produced in the process of decomposition and fermentation.

The seasoning liquor of the present invention is tinted by the polymerization of glucose and amino acids. So that, by setting the ratio of pentose and glucose to a certain value, a desirable reddish color is brought out without the necessity of the addition of any coloring agent.

The seasoning liquor of the present invention, accordingly, does not contain any food additives such as antiseptic and coloring agent, so that there is no fear of causing health hazard by food contamination. Therefore, the use of the seasoning liquor of the present invention can be largely expected.

In the production method of the present invention, α-amylase or glucoamylase is used as an amylolytic enzyme and starch is firstly decomposed and protein is then decomposed. The alcohol fermentation depending upon the saccharification of starch, promotes the decompositions of protein. Therefore, the decomposition and fermentation of the mash can be accomplished within only about 25-35 days, and a well ripened effective seasoning liquor is produced (Incidentally, the brewing period for producing soy sauce is about 6 months in the conventional art).

Further, in the method of the present invention, the substances having disagreeable odor or taste such as levulinic acid and formic acid are not produced in the decomposition process of carbohydrates, so that the seasoning effect of the product is quite good.

According to the method of the present invention, the use of koji can be reduced by the quantity corresponding to the saccharification power of amylase that is added to the conversion of starch.

The present invention will be further described in detail with regard to several examples.

EXAMPLE 1

As the raw material, 48 lit. of corn protein dispersion containing 25% of protein (nitrogen: 4.0% and 18% of starch was used. This protein dispersion was prepared by refining the corn protein dispersion that was obtained as a by-product in the production of corn starch.

In the preparation of koji, water was spread over 6.5 kg of defatted soybean and 3.2 kg of wheat bran until the water content of the mixture became 40%. and it was then cooked for 40 minutes with steam and cooled thereafter. Then, 6.4 kg of roasted crushed wheat was mixed to the above and it was inoculated with mold starter (mixture of Aspergillus oryzae and Aspergillus sojae) to be incubated for 48 hours in an incubation chamber (koji-muro).

Added to the above refined corn protein dispersion are 55 g of α-amylase (10,000 u/g) and 45 ml of liquid glucoamylase (1,000 u/g), and saccharification was carried out for 48 hours at 60° C. After 48 hours, 5 lit. of cultured lactic acid bacteria of Lactobacillus was added to the product of the above, and after 19 hours when the pH became 4.2, the pasteurization and deactivation of bacteria and enzyme was performed by heat treatment at 70°-80° C. for 45 minutes. Then it was cooled to 33° C. and mixed with the above koji which had been soaked in 40 lit. of 17.5% saline solution for 24 hours. Further 24 hours after the addition of koji, 5 lit. of liquid yeast (Saccharomyces rouxii) was added to the above mixture, thereby accomplishing the mashing operation. After this, the decomposition and fermentation were carried out for 30 days at 25°-30° C. In this period, the concentration of sodium chloride was increased step by step by adding 5.0 kg of sodium chloride on 5th day and 4.8 kg on 15th day. After 30 days, 102 lit. of the fermented mash was filtered with pressure and sodium chloride was added to the filtrate. Then, it was subjected to heat treatment at 80° C. to obtain a product of 82 lit. The results of analyses with regard to the product were as follows:

| Total nitrogen: | 2.28% | formol nitrogen: | 1.41% |
|---|---|---|---|
| alcohol: | 2.5% | reducing sugar: | 1.2% |
| sodium chloride: | 16.5% | pH: | 5.2 |
| buffer index: | 0.6 | | |

The savor of this seasoning liquor was quite good without the disagreeable odor of levulinic acid, etc. The tint was clear reddish brown which was brighter than the dark brown of soy sauce. With regard to preservative property, neither putrefaction nor denaturation was observed after 3 months' preservation. Further, in connection with anti-fungal property $10^5$ cells of bacteria and yeast were inoculated, however, they decreased to $10^2$ cells after 4 weeks.

EXAMPLE 2

A dispersion (48 lit.) containing 21.0% of protein (nitrogen: 3.4%) and 7.2% of starch was prepared by using the same corn protein dispersion as that of the foregoing Example 1, and employed as the raw material.

In like manner as Example 1, koji was prepared by using 4.2 kg of defatted soybean, 6 kg of wheat bran and 1.8 kg of roasted crushed wheat.

Further, through the same process as that of Example 1, 81 lit. of product was obtained after 25 days with the fermentation temperature of 25°-33° C. The results of analyses were as follow:

| Total nitrogen: | 1.81% | formol nitrogen: | 1.16% |
|---|---|---|---|
| alcohol: | 2.1% | reducing sugar: | 1.1% |
| sodium chloride: | 16.5% | pH: | 5.0 |
| buffer index: | 0.5 | | |

The savor of this seasoning liquor was quite good without the disagreeable odor of levulinic acid, etc. The tint of the liquor was clear reddish brown which was brighter than the dark brown of the conventional soy sauce. With regard to preservative property, neither putrefaction nor denaturation was observed within 3 months' preservation. Further, in connection with anti-fungal property, $10^5$ cells of bacteria and yeast were inoculated, however, they decreased to $10^2$ cells after 4 weeks.

EXAMPLE 3

The raw material used in this Example was 48 lit. of the dispersion containing 28.5% of protein (nitrogen: 4.5%) and 10.0% of starch which was prepared by using the same corn protein dispersion as that of the foregoing Example 1.

While, koji was prepared in like manner as Example 1 by using 7 kg of wheat bran and 7 kg of roasted crushed wheat.

Further, the corresponding steps of Examples 1 and 2 were repeated, in which the temperature between the fifth day to the end of fermentation was maintained at 27° C. The decomposition and fermentation were finished in 35 days to obtain 84 lit. of a product by treating in like manner as Example 1. The results of analyses of the product were as follows:

| Total nitrogen: | 2.42% | formol nitrogen: | 1.47% |
|---|---|---|---|
| alcohol: | 3.0% | reducing sugar: | 1.5% |
| sodium chloride: | 16.5% | pH: | 5.2 |
| buffer index: | 0.6 | | |

The savor of this seasoning liquor was quite good without the disagreeable odor of levulinic acid, etc. The tint of the seasoning liquor was clear reddish brown which was brighter than the dark brown of the conventional soy sauce. With regard to preservative property, neither putrefication nor denaturation was observed with 3 months' preservation. Further, in connection with anti-fungal property, $10^5$ cells of bacteria and yeast were inoculated, however, they decreased to $10^2$ cells after 4 weeks.

The above examples are preferably embodiments of the present invention, however, they are only illustrative and by no means restrictive of the invention. Accordingly, it will be understood that the present invention may be practised with various modifications without departing from the principle of the present invention, which must be all included within the scope of the following claims.

What is claimed is:

1. A method for producing a seasoning liquor comprising the steps of: saccharifying starch contained in the raw material of a corn protein aqueous solution or dispersion by adding amylolytic enzyme to said corn protein aqueous solution or dispersion and performing said saccharification at 50°-60° C. for 20-50 hours.

performing lactic fermentation by adding lactic acid bacteria to adjust the pH of said raw material liquid to 4.0-5.0, deactivating said enzyme and pasteurizing said bacteria by heat treatment, and performing then the decomposition of protein and starch and alcohol fermentation at 25°-33° C. for 25-35 days in the presence of sodium chloride by adding koji and yeast, said koji containing the substrates of at least two members selected from the group consisting of corn starch, wheat, wheat bran and soybean, the amount of koji added being between about 1 to 3 times as much as the weight of protein contained in the liquid to which it is added, and the concentration of sodium chloride in the liquid is from 5-6% after the koji has been added.

2. A method for producing a seasoning liquor as claimed in claim 1, wherein said amylolytic enzyme is α-amylase and or glucoamylase.

3. A method for producing a seasoning liquor as claimed in claim 2, wherein the addition quantity of said amylolytic enzyme is 40-120 units of α-amylase or 4-12 units of glucoamylase per 1 g of starch.

4. A method for producing a seasoning liquor as claimed in claim 1, wherein said koji is soaked for 24 hours at room temperature in 2-3 fold quantity of 15-25 wt.% saline solution prior to being added.

5. A method for producing a seasoning liquor as claimed in claim 1, wherein said alcohol fermentation is performed at 25°-33° C. after adding yeast.

6. A method for producing a seasoning liquor as claimed in claim 1, wherein the concentration of sodium chloride in said alcohol fermentation is made 5-6 W/V% in the stage of initial fermentation to produce 1 W/V% of alcohol, then increasing the concentration of sodium chloride to 11-12 W/V% after said initial fermentation stage to produce 1-2 W/V% of alcohol, and further increasing the concentration of sodium chloride to 15-18 W/V% to produce 2-3 W/V% of alcohol.

7. A method for producing a seasoning liquor as claimed in claim 1, wherein said yeast is saccharomyces rouxii.

8. A method for producing a seasoning liquor as claimed in claim 1, wherein said corn protein aqueous solution or dispersion contains 5-20 wt.% of starch and 20-30 wt.% of protein.

9. A method for producing a seasoning liquor as claimed in claim 1, wherein said lactic acid bacteria is the genus of Lactobacillus.

* * * * *